United States Patent

Lüders et al.

[11] 3,725,356
[45] Apr. 3, 1973

[54] POLYMERIC N-CARBONYL SULFONAMIDES IN PHOTOPOLYMERIZABLE COMPOSITIONS AND PROCESS FOR PREPARATION

[75] Inventors: Walter Lüders, Neu-Isenburg; Hartmut Steppan, Wiesbaden-Dotzheim; Kurt-Walter Klüpfel, Wiesbaden-Sonnenberg, all of Germany

[73] Assignee: Kalle Aktiengesellschaft, Wiesbaden-Biebrich, Germany

[22] Filed: June 2, 1971

[21] Appl. No.: 149,391

[30] Foreign Application Priority Data

June 4, 1970 Germany.....................P 20 27 466.2

[52] U.S. Cl..............260/77.5 CH, 96/35.1, 96/115, 260/77.5 CH
[51] Int. Cl.......C08g 22/02, C08g 22/04, G03c 1/70
[58] Field of Search ...260/77.5 R, 77.5 CH, 77.5 CR

[56] References Cited

UNITED STATES PATENTS

| | | | |
|---|---|---|---|
| 3,622,532 | 11/1971 | Kolb et al. | 260/29.6 H |
| 3,424,730 | 1/1969 | Lee | 260/80.3 |
| 3,422,075 | 1/1969 | Taylor | 260/77.5 CR |
| 3,422,165 | 1/1969 | Brotherton et al. | 260/859 |

*Primary Examiner*—Donald E. Czaja
*Assistant Examiner*—H. S. Cockeram
*Attorney*—James E. Bryan

[57] ABSTRACT

This invention relates to novel polymers and to a method of producing the same. The polymers are of reduced specific viscosity between 0.05 and 3.0, preferably between 0.2 and 1.0 dl/g., measured at 25° C. using a 1 percent solution in dioxane, contain substituted N-carbonyl sulfonyl groups in their side chains, and are composed of statistically distributed recurrent structural units of Formula I'

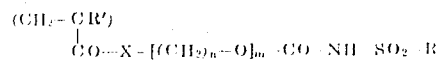

and/or
Formula II'

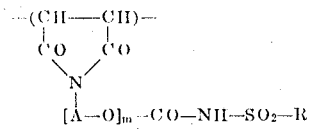

and/or
Formula III'

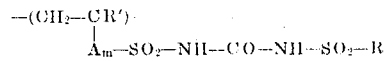

wherein
R is a saturated aliphatic alkyl or alkoxy group each with one to six carbon atoms which may be substituted by one to three halogen atoms, or a cycloaliphatic alkyl group, or an aryl or aryloxy group each with six or 10 carbon atoms which may be substituted up to 3 times by halogen atoms and/or alkyl or alkoxy groups with one to six carbon atoms,
R' is a hydrogen atom or a methyl group,
X is an oxygen atom or an imino group,
A is a phenylene group or an alkylene group with one to four carbon atoms,
n is an integer from 1 to 4, and
m is 1, or may be 0 when X is an imino group,
and which may further comprise, in a statistical distribution, recurrent structural units of the type

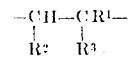

wherein
a. $R^1$ is a hydrogen atom or a methyl group,
  $R^2$ is a hydrogen atom, and
  $R^3$ is a nitrile group, a phenyl group, an amino-carboxyl group, an alkyl carboxyl group with two to 12 carbon atoms, or an acyloxy group with two to 12 carbon atoms, or
b. $R^1$ is an alkyl carboxymethyl group with three to 13 carbon atoms,
  $R^2$ is a hydrogen atom, and
  $R^3$ is an alkyl carboxyl group with two to 12 carbon atoms, or
c. $R^1$ is a hydrogen atom, and
  $R^2$ and $R^3$ are both alkyl carboxyl groups with two to 12 carbon atoms.

3 Claims, No Drawings

POLYMERIC N-CARBONYL SULFONAMIDES IN PHOTOPOLYMERIZABLE COMPOSITIONS AND PROCESS FOR PREPARATION

It is known to react polymers containing hydroxyl groups, e.g., cellulose or polyvinyl alcohol, with sulfonyl isocyanates, and thereby form polymers which are soluble in aqueous alkaline solutions (see U.S. Pat. specification No. 3,422,075).

The process for the preparation of these alkali-soluble polymers has certain disadvantages, because readymade polymers must be reacted with low molecular weight compounds in order to introduce in this manner the groups which cause the solubility of the polymers in aqueous alkalis.

The present invention is concerned with polymers of a reduced specific viscosity between 0.05 and 3.0, preferably between 0.2 and 1.0 dl/g., measured at 25° C. using a 1 percent solution in dioxane, which contain substituted N-carbonyl sulfonamide groups and are composed of statistically distributed recurrent structural units of
Formula I'

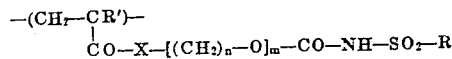

and/or
Formula II'

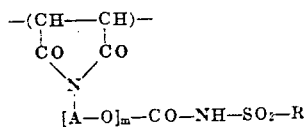

and/or
Formula III'

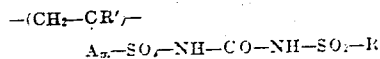

wherein

R is a saturated aliphatic alkyl or alkoxy group each with one to six, preferably one to three carbon atoms, which may be substituted by one to three halogen atoms, preferably chlorine atoms, or a cycloaliphatic alkyl group, or an aryl or aryloxy group each with six or 10 carbon atoms, which may be substituted up to 3 times with halogen atoms, preferably chlorine atoms, and/or alkyl or alkoxy groups with one to six, preferably one to three carbon atoms, R' is a hydrogen atom or a methyl group, X is an oxygen atom or an imino group, A is a phenylene group or an alkylene group with one to four, preferably one or two carbon atoms, $n$ is an integer from 1 to 4, preferably 1 or 2, and $m$ is 1, or may be 0 when X is an imino group, and may further comprise, in a statistical distribution, recurrent structural units of the formula

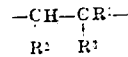

wherein a. $R^1$ is a hydrogen atom or a methyl group, $R^2$ is a hydrogen atom, and $R^3$ is a nitrile group, a phenyl group, an amino carboxyl group, an alkyl carboxyl group with two to 12, preferably two to six carbon atoms, or an acyloxy group with two to 12, preferably two to six carbon atoms, or wherein b. $R^1$ is an alkyl carboxymethyl group with three to 13, preferably three to seven carbon atoms, $R^2$ is a hydrogen atom, and $R^3$ is an alkyl carboxy group with two to 12, preferably two to six carbon atoms, or wherein c. $R^1$ is a hydrogen atom, and $R^2$ and $R^3$ are both alkyl carboxy groups with two to 12, preferably two to six carbon atoms.

The invention also provides a process for the preparation of polymers which contain substituted N-carbonyl sulfonamido groups in their side chains, which process is performed at temperatures ranging from 20° to 140° C. and, if desired, in the presence of radical-forming catalysts. In the process, N-carbonyl sulfonamides substituted by unsaturated groups and corresponding to one of the following formulas I. $R-SO_2-NH-CO-[O-(CH_2)_n]_m-X-CO-CR'=CH_2$ or

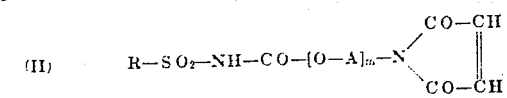

or

III. $R-SO_2-NH-CO-NH-SO_2-A_m-CR'=CH_2$ wherein

R is a saturated aliphatic alkyl or alkoxy group each with one to six, preferably one to three carbon atoms, which may be substituted by one to three halogen atoms, preferably chlorine atoms, or a cycloaliphatic alkyl group, or an aryl or aryloxy group each with six or 10 carbon atoms, which may be substituted up to 3 times by halogen atoms, preferably chlorine atoms, and/or by alkyl or alkoxy groups each with one to six, preferably one to three carbon atoms, R' is a hydrogen atom or a methyl group, X is an oxygen atom or an imino group, A is a phenylene group or an alkylene group with one to four, preferably one or two carbon atoms, $n$ is an integer from 1 to 4, preferably 1 or 2, and $m$ is 1, or may be 0 when X is an imino group, are used for polymerization, if desired in the presence of other olefinically unsaturated compounds capable of radical polymerization.

Suitable monomeric compounds which are polymerized in accordance with the present invention either alone or in admixture with each other, are substituted N-carbonyl sulfonamides, i.e., N-sulfonyl carbamic acid esters (N-sulfonyl urethanes) and N-sulfonyl ureas carrying olefinically unsaturated substituents. Examples of suitable compounds are: N-(p-tolylsulfonyl)-carbamic acid-(β-methacryloyloxy)-ethyl ester, N-(p-tolylsulfonyl)-carbamic acid-(γ-methacryloyloxy)-propylester, N-(β-chloroethylsulfonyl)-carbamic acid-(β-methacryloyloxy)-ethylester, N-(p-tolyloxysulfonyl)-carbamic acid-(β-methacryloyloxy)-ethyl ester, N-(2,6-dimethyl-phenoxysulfonyl)-carbamic acid-(β-methacryloxy)-ethylester, N-(p-tolylsulfonyl)-carbamic acid-(acrylamido)-methylester, N-(p-tolylsulfonyl)-carbamic acid-(maleinimido)-methyl ester, N-(β- chloroethylsulfonyl)-carbamic acid-(maleinimido)-methyl ester, N-(p-tolylsulfonyl)-N'-acryloyl-urea, N-(p-tolyloxysulfonyl)-N'-acryloyl-urea, N-(p-tolylsulfonyl)-N'-(p-vinylphenylsulfonyl)-urea, N-(p-tolylsulfonyl)-N'-maleoyl-urea, N-(β-chloroethylsulfonyl)-N'maleoyl-urea, and N-(p-tolylsulfonyl)-carbamic acid-(p-N'-maleinimido)-phenyl ester.

The monomeric compounds used according to the invention for homo- or copolymerization are prepared by reacting a sulfonyl isocyanate of the formula

IV. $R - SO_2 - NCO$ wherein

R is a saturated aliphatic alkyl or alkoxy group each with one to six carbon atoms, which may be substituted by one to three halogen atoms, or a cycloaliphatic alkyl group, or an aryl or aryloxy group each with six or 10 carbon atoms, which may be substituted up to 3 times by halogen atoms and/or alkyl or alkoxy groups each with one to six carbon atoms,
with an H-acidic unsaturated compound of one of the following formulas:

V. $H-[O-(CH_2)_n]_m-X-CO-CR'=CH_2$ or

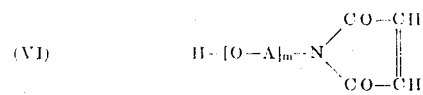

or

VII. $H_2N-SO_2-A_m-CR'=CH_2$ wherein

R' is a hydrogen atom or a methyl group,

X is an oxygen atom or an imino group,

A is a phenylene group or an alkylene group with one to four carbon atoms, $n$ is an integer from 1 to 4, and $m$ is 1, or may be 0 when X is an imino group.

The reaction is performed at temperatures ranging from 0° to 100° C., under normal atmospheric pressure and anhydrous conditions, i.e., in an inert gas atmosphere.

The monomers used according to the present invention are polymerized with the aid of known radical-forming catalysts (initiators). Organic peroxides, such as benzoyl peroxide, di-tert.-butyl peroxide, lauryl peroxide, cyclohexylsulfonyl peroxide, and cumene hydroperoxide, are particularly suitable, and also percarboxylic esters, such as tert.-butyl peracetate, and percarbonic esters, such as diisopropyl and di-tert.-butylperoxide-dicarbonate, and azo compounds, such as α,α'-azocyclohexane-carboxylic acid nitrile, α,α'-azoisobutyric acid nitrile, or α,α'-azoisobutyric acid amide.

The N-sulfonyl carbamic acid derivatives and N-sulfonyl urea derivatives to be used according to the invention also may be copolymerized with other olefinically unsaturated compounds which are capable of radical polymerization. Particularly suitable compounds are those corresponding to the following formula $$R^2 - CH = CR^1 - R^3$$

wherein a. $R^1$ is a hydrogen atom or a methyl group, $R^2$ is a hydrogen atom, and $R^3$ is a nitrile group, a phenyl group, an aminocarboxyl group, an alkyl carboxyl group with two to 12, preferably two to six carbon atoms, or an acyloxy group with two to 12, preferably two to six carbon atoms, or wherein b. $R^1$ is an alkyl carboxymethyl group with three to 13, preferably three to seven carbon atoms, $R^2$ is a hydrogen atom, and $R^3$ is an alkyl carboxyl group with two to 12, preferably two to six carbon atoms, or wherein c. $R^1$ is a hydrogen atom, and $R^2$ and $R^3$ are both alkyl carboxyl groups with two to 12, preferably two to six carbon atoms.

Suitable compounds are, for example: acrylonitrile, styrene, α-methyl-styrene, acrylamide and methacrylamide, acrylic acid esters and methacrylic acid esters of straight-chain or branched-chain saturated aliphatic alcohols with one to 11, preferably one to five carbon atoms, vinyl esters of straight-chain or branched-chain, saturated, aliphatic carboxylic acids with two to 12, preferably two to six, carbon atoms, and maleic acid, fumaric acid, and itaconic acid esters of straight-chain or branched-chain saturated aliphatic alcohols with one to 11, preferably one to five carbon atoms.

The above mentioned catalysts may be used as polymerization initiators for the copolymerization. Polymerization and copolymerization may take place in bulk, in an emulsion, in suspension, or — most advantageously — in solution.

Organic solvents which are inert under the polymerization conditions prevailing may be used as solvents, in particular aromatic hydrocarbons, for example benzene, toluene or xylene; chlorinated aromatic hydrocarbons, for example chlorobenzene; aliphatic ketones and ethers, for example acetone, methyl ethyl ketone, diisopropyl ether or diethylether; and cyclic ethers, for example 1,4-dioxane. The polymerization process according to the invention is performed at temperatures ranging from 20° to 140° C., preferably from 70° to 100° C.

If the N-carbonyl sulfonamide is prepared in a solvent which is suitable for the polymerization process, the monomeric compound need not be separated. In this case, the monomer present in the solution may be polymerized without further processing steps, simply by adding a catalyst and one or more comonomers, if desired.

If styrene is used as a comonomer, the copolymerization may be performed without the addition of a catalyst, by a thermal process.

The quantity of olefinically unsaturated compounds used as comonomers ranges from 5 to 95 percent, preferably from 50 to 80 percent by weight, based on the total quantity of monomeric compounds present.

For adjustment of the molecular weight to a desired value, adjusting substances may be added during the polymerization process, for example organic sulfur compounds, such as mercaptans, e.g., n-butyl mercaptan or n-dodecyl-mercaptan.

If the polymerization or copolymerization process of the invention is performed in a solution, the polymer is separated by introducing the reaction solution dropwise, while agitating, into 5 to 20 times its own quantity of a precipitating agent which is miscible with the solvent used, whereupon the polymer precipitates in the form of easily filterable flakes. Suitable precipitating agents are water, lower alcohols, e.g., methanol or ethanol, and aliphatic hydrocarbons, e.g., hexane and heptane.

The polymers and copolymers according to the invention may be used as water-retaining agents, as protective colloids in the preparation of dispersions, as flocculating agents, or as pigment-dispersing agents. Copolymers containing N-carbonyl sulfonamide groups are further distinguished by an improved dye receptivity.

The alkali-soluble or alkali-softenable polymers of the invention are particularly useful as binders for light-sensitive layers. They may be applied, for example, together with diazo compounds or photopolymerizable systems in layers intended for the photomechanical production of printing forms, particularly when copying layers are to be produced which are capable of being developed with mostly aqueous alkaline solutions. When used as binders in such copying layers, the polymers according to the invention yield printing forms which are very resistant to abrasion. Also on aluminum supports having highly roughened surfaces, e.g., aluminum plates having an electrolytically roughened and perhaps additionally eloxated surface, such as are used with advantage for the preparation of planographic printing plates, the polymers of the invention yield layers which can be developed relatively easily into a clean printing form.

The copolymers derived from the esters of acrylic or methacrylic acids with lower alcohols, and the esters of N-(arylsulfonyl)-carbamic acid with ω-[(meth)acryloyloxy]-alkanols are particularly suitable as binders for light-sensitive layers.

One of the types of copolymers which is particularly suitable for use in reproduction layers intended for the preparation of planographic printing forms, are copolymers of methylmethacrylate and N-(p-tolylsulfonyl)-carbamic acid-(β-methacryloyloxy)-ethyl ester, the proportion by weight between methylmethacrylate and N-(p-tolylsulfonyl)-carbamic acid-(β-methacryloyloxy)-ethyl ester being normally between 1:1 and 4:1.

In the following examples, parts and percentages are by weight.

EXAMPLE 1 a. At room temperature and while agitating and passing nitrogen over the reaction mixture, a solution of 38.5 parts of β-hydroxy-ethylmethacrylate in 45 parts of anhydrous toluene is added dropwise, over a period of 30 minutes, to a solution of 66 parts of p-tolylsulfonyl isocyanate in 70 parts of anhydrous toluene. The mixture is cooled to 0° C. and stirred for 1 hour at this temperature. The white precipitate which forms is drawn off by suction and recrystallized from toluene. Ninety-six parts of N-(p-tolylsulfonyl)-carbamic acid-(β-methacryloyloxy)-ethyl ester with a melting point of 79°–80° C. are obtained.

b. A solution of 50 parts of the N-(p-tolylsulfonyl)-carbamic acid-(β-methacryloyloxy)-ethyl ester, prepared as described sub (a), in 200 parts of toluene, to which 0.5 part of cumene hydroperoxide (in the form of a 70 percent solution in cumene) has been added, while stirring and passing nitrogen over the reaction mixture, is subsequently stirred for 20 hours at 90° C. By stirring the solution into 2,500 parts of n-heptane, the polymer is precipitated, then drawn off by suction, washed several times with n-heptane, and dried at 50° C. in a nitrogen atmosphere. Forty-six parts of a white polymer with an RSV value of 0.38 are thus obtained. (RSV value is the value of the reduced specific viscosity $\eta_{red}/c$, wherein "c" means the concentration in grams per 100 milliliters of solvent. It is measured at 25° C., using a 1 percent solution of the polymer in dioxane.)

EXAMPLE 2 a. At room temperature and while agitating and passing nitrogen over the reaction mixture, a solution of 98.5 parts of p-tolylsulfonyl isocyanate in 100 parts of anhydrous 1,4-dioxane is added dropwise, over a period of 30 minutes, to a solution of 35.5 parts of acrylamide in 250 parts of anhydrous 1,4-dioxane. The mixture is stirred for 1 hour at room temperature and then diluted with 500 parts of n-hexane. The precipitate which separates is drawn off by suction and recrystallized from toluene. 110 parts of N-(p-tolylsulfonyl)-N'-acryloyl-urea with a melting point of 155°–160°C. are thus obtained.

b. A solution of 100 parts of the N-(p-tolylsulfonyl)-N'-acryloyl-urea, prepared as described sub (a), in 300 parts of 1,4-dioxane, to which 1 part of azoisobutyric acid nitrile has been added while agitating and passing nitrogen over the reaction mixture, is stirred for 5 hours at 75° C. The polymer is precipitated by introducing the solution into 3,000 parts of water and is then drawn off by suction, washed several times with water, and dried at 50° C. in a nitrogen atmosphere. Eighty parts of a white polymer are thus obtained, which has an RSV value of 0.15 (determined as described in Example 1).

EXAMPLE 3

Twelve parts of N-(p-tolylsulfonyl)-carbamic acid-(β-methacryloyloxy)-ethyl ester are dissolved in 120 parts of 1,4-dioxane, and 28 parts of methylmethacrylate and 0.1 part of cumene hydroperoxide (in the form of a 70 percent solution in cumene) are added. One quarter of this mixture is heated to 90° C. while agitating and passing nitrogen over it. After 15 minutes, the remaining three quarters of the monomer mixture are added in such a manner that, over a period of 5 hours, proportionate quantities of the mixture are added, each time in one batch, at intervals of 30 minutes. Thereafter, the mixture is stirred for 17 hours at 90° C. In order to separate the copolymer, the viscous solution thus obtained is added dropwise, while stirring, into 1,000 parts of water. The solid substance produced is drawn off by suction, washed with water, and dried at 40° C. in a nitrogen atmosphere. Thirty-six parts of a white copolymer of an RSV value of 0.34 (determined as described in Example 1) are thus obtained.

The elemental analysis of the copolymer yields the following percentages:

| | |
|---|---|
| Calculated: | S 2.94 |
| Found: | S 3.2 |

EXAMPLES 4 TO 9

Copolymers containing varying quantities of N-(p-tolylsulfonyl)-carbamic acid-(β-methacryloyloxy)-ethyl ester (TSCM for short) and of methyl methacrylate (MMA for short) are prepared as described in Example 3, using dioxane as the solvent and cumene hydroperoxide as a catalyst:

| Proportion b.w. between TSCM : MMA | Yield (%) | RSV value (dl/g.) | TSCM content of copolymer (% by weight) |
|---|---|---|---|
| 1 : 9 | 65 | 1.11 | 12 |
| 1 : 4 | 73 | 0.91 | 23 |
| 7 : 13 | 65 | 0.68 | 39 |
| 2 : 3 | 60 | 0.51 | 46 |
| 1 : 1 | 88 | 0.61 | 52 |
| 7 : 3 | 80 | 1.19 | 75 |

The RSV value was determined as described in Example 1.

EXAMPLE 10

11.5 parts of p-methylphenoxy-sulfonyl isocyanate are dissolved in 50 parts of anhydrous 1,4-dioxane. While stirring and passing nitrogen over the reaction mixture, a solution of 6.5 parts of β-hydroxyethyl-methacrylate in 50 parts of anhydrous 1,4-dioxane is added dropwise, at room temperature, over a period of 30 minutes. The mixture is stirred for another hour at room temperature, then 42 parts of ethyl acrylate and 0.6 part of azoisobutyric acid nitrile are added, and the mixture is heated to 100° C. The mixture is stirred for 2 hours at this temperature and then poured into 1,000 parts of water. The product which precipitates is drawn off by suction, washed with water, and dried at 50° C. in a nitrogen atmosphere. Forty parts of a copolymer are thus obtained which has an RSV value of 1.24 (determined as described in Example 1).

The elemental analysis of the copolymer yields the following percentages:

| Calculated: | N 1.22 | S 2.8 |
|---|---|---|
| Found: | N 1.4 | S 2.5 |

EXAMPLE 11

A copolymer is produced from 12 parts of N-(p-tolylsulfonyl)-carbamic acid-(γ-methacryloyloxy)-propylester and 28 parts of methyl methacrylate by the method described in Example 3. Thirty-five parts of a white copolymer are obtained which has an RSV value of 0.29 (determined as described in Example 1).

The elemental analysis of the copolymer yields the following percentages:

| Calculated: | S 2.82 |
|---|---|
| Found: | S 3.00 |

EXAMPLE 12

A solution of 13 parts of β-hydroxyethyl methacrylate in 80 parts of anhydrous 1,4-dioxane is heated to 40° C. while nitrogen is passed over the reaction vessel. Then a solution of 17 parts of β-chloroethyl sulfonyl isocyanate in 60 parts of anhydrous 1,4-dioxane is added dropwise, over a period of 15 minutes, while agitating. The reaction mixture is stirred for 3 hours at 40° C. After it has cooled to room temperature, 70 parts of methyl methacrylate and 1 part of azoisobutyric acid nitrile are added. The resulting mixture is added, in batches of 20 parts each, introduced at intervals of 10 minutes, to 250 parts of anhydrous methyl ethyl ketone which is heated to the boiling point while agitating and passing nitrogen over the reaction mixture. After the addition of the last batch, the mixture is further stirred for 20 hours with reflux. In order to separate the copolymer, the solution is introduced dropwise, while stirring, into 3,000 parts of water. The solid substance is drawn off by suction, washed with water, and dried at 40° C. in a nitrogen atmosphere until a constant weight has been achieved. Ninety-five parts of a white copolymer are thus obtained which has an RSV value of 0.24 (determined as described in Example 1).

The elemental analysis of the copolymer yields the following percentages:

| Calculated: | N 1.4 | S 3.2 | Cl 3.2 |
|---|---|---|---|
| Found: | N 1.5 | S 3.0 | Cl 3.5 |

EXAMPLE 13

A copolymer is prepared from 15 parts of N-(β-chloroethyl-sulfonyl)-carbamic acid-(β-methacryloyloxy)-ethyl ester and 28 parts of methyl methacrylate by the method described in Example 3. Forty parts of a white copolymer are thus obtained which has an RSV value of 0.42 (determined as described in Example 1).

The elemental analysis of the copolymer yields the following percentages:

| Calculated: | N 1.5 | S 3.4 |
|---|---|---|
| Found: | N 1.7 | S 3.7 |

EXAMPLE 14

Thirty parts of N-(p-tolylsulfonyl)-carbamic acid-(β-methacryloyloxy)-ethyl ester and 70 parts of methacrylic acid-tert.-butylester are stirred for 6 hours at 110° C. in 300 parts of anhydrous 1,4-dioxane to which 1 part of azoisobutyric acid nitrile has been added, while passing nitrogen over the reaction mixture. For separating the copolymer, the solution is introduced into 3,000 parts of water. After drying, 70 parts of a copolymer are obtained which has an RSV value of 0.96 (determined as described in Example 1).

The elemental analysis of the copolymer yields the following percentages:

| Calculated: | S 2.94 |
|---|---|
| Found: | S 2.60 |

EXAMPLE 15 a. A solution of 39.4 parts of p-tolylsulfonyl isocyanate in 36 parts of anhydrous diethyl ether is added dropwise, over a period of 30 minutes, at room temperature, to a suspension of 25.4 parts of N-methylol maleinimide in 70 parts of anhydrous diethyl ether, while agitating and passing nitrogen over the reaction mixture. The mixture is then stirred for 5 hours at room temperature, and the precipitate which forms is drawn off by suction, recrystallized from toluene, and dried at 50° C. in a nitrogen atmosphere. Fifty-seven parts of N-(p-tolyl-sulfonyl)-carbamic acid-(maleinimido)-methyl ester with a melting point of 160° C. are thus obtained.

b. Twenty parts of the monomer prepared as described sub (a) are mixed with 80 parts of styrene in 400 parts of acetone to which 1 part of azoisobutyric acid nitrile has been added, and while nitrogen is passed over it, the mixture is heated to 60° C. and is then further stirred for 20 hours at this temperature. The resultant solution is introduced into 2,000 parts of water, with stirring, whereupon the copolymer produced precipitates in the form of a fine white powder. The powder is drawn off by suction, washed with water, and dried at 40° C. in a nitrogen atmosphere. Sixty parts of a copolymer are thus obtained which has an RSV value of 0.82 (determined as described in Example 1).

The elemental analysis of the copolymer yields the following percentages:

| Calculated: | S 1.9 |
|---|---|
| Found: | S 2.5 |

EXAMPLE 16 a. A solution of 34 parts of β-chloroethyl sulfonyl isocyanate in 36 parts of anhydrous diethyl ether is added dropwise, while thoroughly stirring and at room temperature, to a suspension of 25.4 parts of N-methylolmaleinimide in 70 parts of anhydrous diethyl ether, while passing nitrogen over the reaction mixture. The mixture is then stirred for 5 hours at room temperature. The precipitate which forms is drawn off by suction, recrystallized from ethanol, and dried at 50° C. in a nitrogen atmosphere. 57.5 parts of N-(β-chloroethyl-sulfonyl)-carbamic acid-(maleinimido)-methyl ester with a melting point of 140° to 142° C. are thus obtained.

b. Ten parts of the monomer produced as described sub (a) are mixed with 23.5 parts of styrene in 150 parts of chlorobenzene, and the mixture is stirred for 6 hours at 120° C. while nitrogen is passed over it. After it has cooled to room temperature, the solution is introduced into 1,000 parts of methanol while agitating. The precipitate which forms is drawn off by suction, washed with methanol, and dried at 40° C. in a nitrogen atmosphere. Twenty parts of a copolymer are thus obtained which has an RSV value of 0.98, determined by using a 1 percent solution in dimethyl formamide at 25° C. The elemental analysis of the copolymer yields the following percentages:

| Calculated: | S 4.1 |
|---|---|
| Found: | S 5.0 |

EXAMPLE 17 a. A solution of 100 parts of p-tolylsulfonyl isocyanate in 250 parts of anhydrous 1,4-dioxane is added dropwise, over a period of 20 minutes, at room temperature, to a solution of 91 parts of p-styryl sulfonamide in 500 parts of anhydrous 1,4-dioxane, while stirring and passing nitrogen over the reaction mixture. The mixture is stirred for 1 hour at room temperature and then diluted by adding 650 parts of n-heptane. The precipitate which forms is drawn off by suction, recrystallized from toluene, and dried in a vacuum exsiccator. Eighty parts of N-(p-tolylsulfonyl)-N'-(p-styrylsulfonyl)-urea of a melting point of 125° to 128° C. are thus obtained.

b. Thirty parts of the monomer prepared as described sub (a) and 70 parts of styrene are dissolved in 400 parts of anhydrous 1,4-dioxane. After adding 1 part of azoisobutyric acid nitrile, one-fourth of the mixture is heated to 90° C. while agitating and passing nitrogen over it. After 15 minutes, the other three-fourths of the monomer mixture are added in such a manner that, over a period of 5 hours, proportionate quantities of the mixture are added, each time in one batch, at intervals of 30 minutes. Thereafter, the reaction mixture is stirred for 17 hours at 90° C. For the separation of the copolymer, the viscous solution is added dropwise, and while stirring, to 700 parts of water. The solid component is drawn off by suction, washed with water, and dried at 40° C. in a nitrogen atmosphere. Eighty parts of a copolymer are thus obtained which has an RSV value of 0.41, measured as described in Example 16. The elemental analysis of the copolymer yields the following percentages:

| Calculated: | S 5.05 |
|---|---|
| Found: | S 4.9 |

EXAMPLE 18 a. A solution of 98.5 parts of p-tolylsulfonyl isocyanate in 100 parts of anhydrous 1,4-dioxane is added dropwise, over a period of 30 minutes, at room temperature, to a solution of 35.5 parts of acrylamide in 250 parts of anhydrous 1,4-dioxane, while stirring and passing nitrogen over the reaction mixture. The mixture is stirred for 1 hour at room temperature and is then diluted by adding 500 parts of n-hexane. The precipitate which forms is drawn off by suction, recrystallized from toluene, and dried at 50° C. in a nitrogen atmosphere. 111 parts of N-(p-tolylsulfonyl)-N'-acryloyl-urea with a melting point of 155°–160°C. are thus obtained.

b. Thirty parts of the monomer prepared as described sub (a) are mixed with 70 parts of acrylonitrile, and then 600 parts of 1,4-dioxane and 1.5 parts of azoisobutyric acid nitrile are added. While passing nitrogen over it, the reaction mixture is stirred first for 3 hours at 75° C. and then for 2 hours at 100° C. The precipitate which forms is drawn off by suction, and dried at 40° C. in a nitrogen atmosphere. Ninety-five parts of a white copolymer are thus obtained which has an RSV value of 0.56, measured as described in Example 16. The elemental analysis of the copolymer yields the following percentages:

| Calculated: | S 3.58 |
|---|---|
| Found: | S 3.5 |

EXAMPLE 19

A solution of 10 parts of maleinimide in 60 parts of anhydrous 1,4-dioxane is added dropwise, over a period of 30 minutes and at room temperature, to a solution of 20 parts of p-tolylsulfonyl isocyanate in 100 parts of anhydrous 1,4-dioxane, while stirring and passing nitrogen over the reaction mixture. The mixture is stirred for 1 hour at room temperature, then mixed with 70 parts of styrene, 60 parts of anhydrous 1,4-dioxane, and 1 part of azoisobutyric acid nitrile, and heated for 5 hours to 90° C. In order to separate the copolymer, the solution is introduced into 2,000 parts of n-heptane while stirring. The solid substance is drawn off by suction and dried at 50° C. in a nitrogen atmosphere. Sixty-five parts of a white copolymer are thus obtained which has an RSV value of 0.14 (measured by using a 1 percent solution in dioxane at 25° C.). The elemental analysis of the copolymer yields the following percentages:

| Calculated: | S 3.3 |
| Found: | S 3.4 |

EXAMPLE 20

A solution of 11 parts of p-tolylsulfonyl isocyanate in 50 parts of anhydrous 1,4-dioxane is added dropwise, over a period of 30 minutes and at room temperature, to a solution of 10 parts of p-hydroxyphenyl-maleinimide in 100 parts of anhydrous 1,4-dioxane, while agitating and passing nitrogen over the reaction mixture. The mixture is stirred for 1 hour at room temperature and then mixed with 80 parts of styrene and 1 part of azoisobutyric acid nitrile. One-fourth of the resulting mixture is heated to 90° C. while agitating and passing nitrogen over it, and after 15 minutes, the other three-fourths of the monomer mixture are added in such a manner, that for a period of 5 hours, proportionate quantities of the mixture are added, each time in one batch, every 30 minutes. The mixture is then stirred for 16 hours at 70° C. In order to separate the copolymer, the solution is added dropwise to 2,000 parts of water with stirring. The solid substance which precipitates is drawn off with suction, washed with water, and dried at 40° C. in a nitrogen atmosphere. Eighty-five parts of a copolymer are thus obtained which has an RSV value of 0.22, measured as described in Example 19. The elemental analysis of the copolymer yields the following percentages:

| Calculated: | S 1.7 |
| Found: | S 1.9 |

The suitability of the polymers produced by the methods described in Examples 3, 10, and 12 as binders in photopolymerizable reproduction materials is tested as follows:

Electrolytically roughened aluminum foils are coated with photopolymerizable mixtures of the following general composition, producing a dry film weighing 3 g per square meter: 0.5 part of the binder to be tested, 0.5 part of trimethylol-propane triacrylate, 0.02 part of 2-ethylanthraquinone, and 0.02 part of p-methoxyphenol. The layer is produced by coating the aluminum foil with an ethylene glycol monomethyl ether solution of the components, followed by drying. A 3 percent aqueous polyvinyl alcohol solution, to which 15 percent of lauryl ethyl ether-β-sulfonic acid (sodium salt) — based on the polyvinyl alcohol content — has been added, is then coated onto the light-sensitive layer in such a manner that a coating is produced which, when dry, has a weight of 0.5 to 1 g per square meter.

The light-sensitive aluminum plates thus produced are then exposed for 3 minutes, from a distance of 1 m, to a xenon impulse lamp of 5 kW. After exposure, the plates are developed for periods of up to 1 minute with one of the following developer solutions, then rendered acidic by wiping with an approximately 1 percent aqueous phosphoric acid solution, and inked up with greasy ink. Planographic printing plates are thus obtained which show no scumming and are capable of very long runs. For the layers containing the polymers prepared according to Examples 3 and 12, the developer solution E 1 was used, whereas in the third case, the developer solution E 2 was applied. Particularly favorable results were obtained by using the polymer according to Example 3.

Composition of the Developer Solutions:
Developer Solution E 1:
12 parts b.w. of benzyl alcohol,
20 parts b.w. of ethanol (96%),
10 parts b.w. of $Na_2HPO_4 \cdot 12\ H_2O$,
2.5 parts b.w. of $Na_3PO_4 \cdot 12\ H_2O$,
465 parts b.w. of $H_2O$.
Developer Solution E 2:
2 parts by weight of $Na_3PO_4 \cdot 12\ H_2O$,
98 parts by weight of $H_2O$.

It will be obvious to those skilled in the art that many modifications may be made within the scope of the present invention without departing from the spirit thereof, and the invention includes all such modifications.

What is claimed is:

1. Polymers of reduced specific viscosity between 0.05 and 3.0 dl/g, measured at 25° C. using a 1 percent solution in dioxane, which polymers contain substituted N-carbonyl sulfonyl groups in their side chains and are composed of statistically distributed recurrent structural units of Formula I'

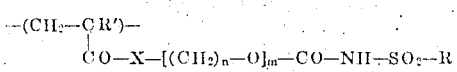

and/or
Formula II'

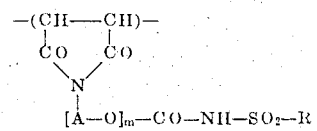

and/or
Formula III'

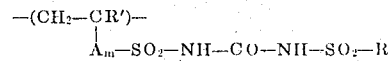

wherein
R is a saturated aliphatic alkyl or alkoxy group each with one to six carbon atoms which may be substituted by one to three halogen atoms, or a cycloaliphatic alkyl group, or an aryl or aryloxy group each with six or 10 carbon atoms which may be substituted up to 3 times by halogen atoms and/or alkyl or alkoxy groups with one to six carbon atoms, R' is a hydrogen atom or a methyl group, X is an oxygen atom or an imino group, A is a phenylene group or an alkylene group with one to four carbon atoms, $n$ is an integer from 1 to 4, and $m$ is 1, or may be 0 when X is an imino group, and which may further comprise, in a statistical distribution, recurrent structural units of the type

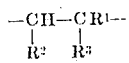

wherein a. $R^1$ is a hydrogen atom or a methyl group $R^2$ is a hydrogen atom, and $R^3$ is a nitrile group, a phenyl group, an amino-carboxyl group, an alkyl carboxyl group with two to 12 carbon atoms, or an acyloxy group with two to 12 carbon atoms, or b. $R^1$ is an alkyl carboxymethyl group with three to 13 carbon atoms, $R^2$ is a hydrogen atom, and $R^3$ is an alkyl carboxyl group with two to 12 carbon atoms, or c. $R^1$ is a hydrogen atom, and $R^2$ and $R^3$ are both alkyl carboxyl groups with two to 12 carbon atoms.

2. Polymers according to claim 1 having reduced specific viscosity between 0.2 and 1.0 dl/g.

3. A photopolymerizable composition including, as a binder, a polymer according to claim 1.

* * * * *